Feb. 5, 1963 W. PONG 3,076,959

ENCODER

Filed Dec. 31, 1956

Inventor
William Pong
By: Graf, Nierman & Burmeister
Attorneys

United States Patent Office 3,076,959
Patented Feb. 5, 1963

3,076,959
ENCODER

William Pong, Cincinnati, Ohio, assignor to The Baldwin Piano Company, Cincinnati, Ohio, a corporation of Ohio Filed Dec. 31, 1956, Ser. No. 631,818
21 Claims. (Cl. 340—347)

The present invention relates generally to analogue to digital encoders and to photocells for use in optical encoders.

Optical encoders are commonly used to transform analogue information to digital form. Generally, optical encoders employ a code disc mounted to a rotatable shaft, and the analogue information is impressed upon the rotatable shaft. The code disc is provided with one or more annular tracks of opaque and transparent segments coaxially disposed about the center of the code disc. A lamp is disposed adjacent to one side of the code disc, and an assembly of photocells confronts the opposite side of the disc. A radial defining slit is disposed between the code disc and the photocell assembly to restrict light passing through transparent portions of the code disc to a narrow pattern upon the photocells. By proper positioning of the transparent portion of the code disc, and pulsing the lamp with a read-out pulse, a digital output may be obtained from the photocells. More recently, the read-out pulse has been used to actuate the photocels, and the lamp continuously operated.

In the optical encoders previously employed, the slit disposed between the photocell assembly and the code disc was required to define a radial region through which the photocells would receive light shorter than the length of the shortest opaque or transparent sector of the code disc. The slit, however, made it necessary to place the photocells more remotely from the code disc than would otherwise be possible, thereby reducing the dark to light response ratio of the photocells. This space limitation also increases the rise time required for a photocell to produce its steady state output after receiving illumination. It is therefore one of the objects of the present invention to provide an optical encoder employing a code disc and plurality of photocells which does not require a radial defining slit between the photocell and the code disc.

The inventor achieves this object of his invention by providing an optical encoder with a code disc and a photocell assembly in which each photocell is constructed with a sensitive area less than the shortest opaque or transparent sector of a track on the code disc. Although a code can be read out of an encoder when the sensitive region of each photocell is approximately equal to the length of the shortest sector, accuracy generally requires the sensitive region to be approximately one-half this length, this distance being defined as one quantum space. It is a further object of the present invention to provide a photocell with a smaller sensitive area than previously available.

The inventor provides a photocell having a pair of electrodes spaced from each other by a distance less than the sector length of a quantum, and providing a photoconductive mass between the confronting electrodes.

It is a further object of the present invention to provide a method of making photocells with confronting pairs of electrodes spaced by a sufficiently small distance to avoid the necessity of a radial-defining slit when employed in an optical encoder.

These and additional objects of the present invention will become readily apparent to those skilled in the art from a further reading of this disclosure, particularly when viewed in the light of the drawings, in which.

Figures 1, 3, 5:
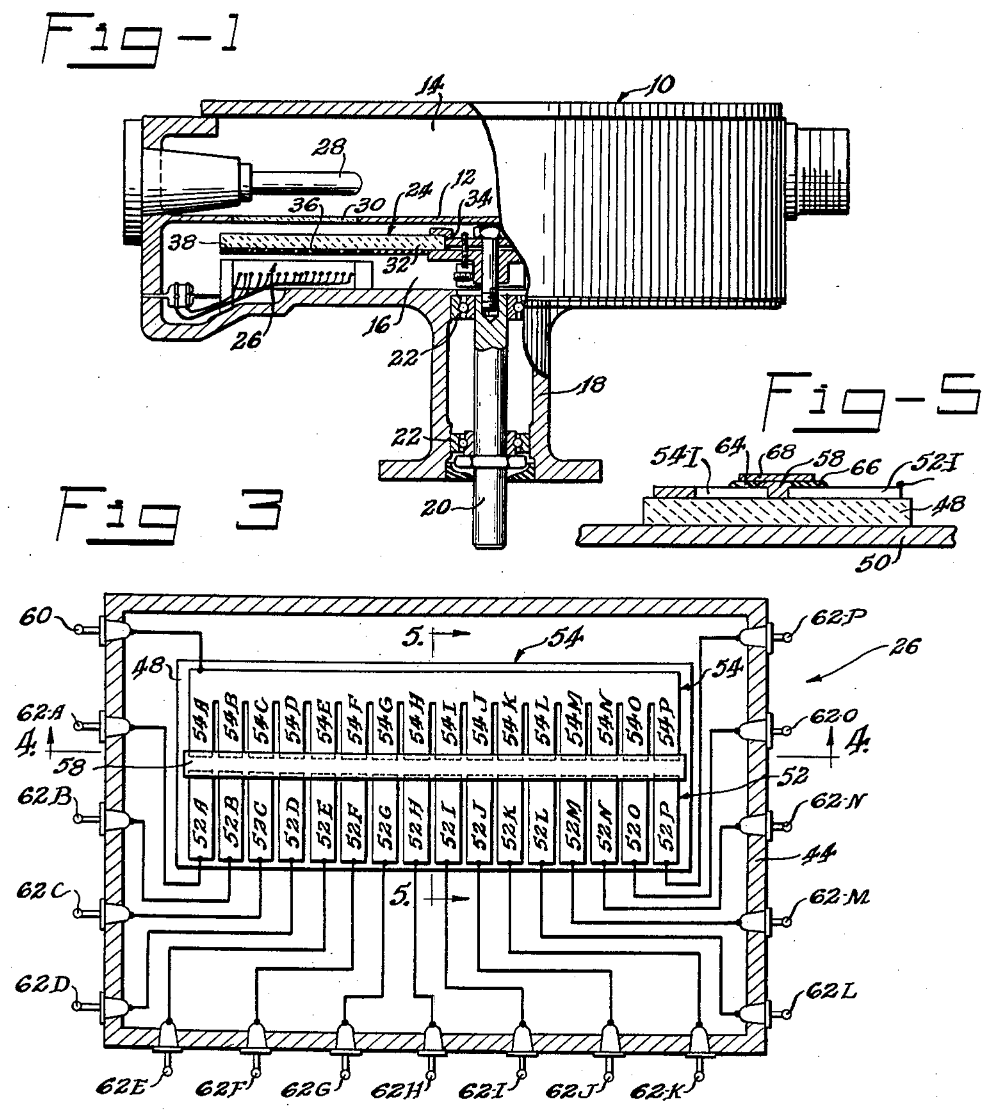
FIGURE 1 is a vertical sectional view of an encoder constructed according to the teachings of the present invention.
FIGURE 3 is a sectional view of the photocell assembly shown in FIGURE 1.
FIGURE 5 is an enlarged fragmentary sectional view taken along the line 5—5 of FIGURE 3.

Referring to FIGURE 1, the optical encoder employs a housing 10 which is cylindrical in shape and has a partition 12 extending therethrough dividing the housing into two compartments 14 and 16. An axial hub 18 extends outwardly from the compartment 16 and a shaft 20 protrudes from the hub 18. The shaft 20 is journaled in bearings 22 mounted within the hub 18, and a code member in the form of a disc 24 is secured to the shaft 20 and rotatable therewith within the compartment 16. A photocell assembly 26 is mounted closely adjacent to the code disc 24 on the side thereof opposite to the partition 12. A lamp 28 is mounted in the compartment 14 aligned with a window 30 in the partition 12 and the photocell assembly 26. The housing 10 is a dust tight unit.

Figure 2:
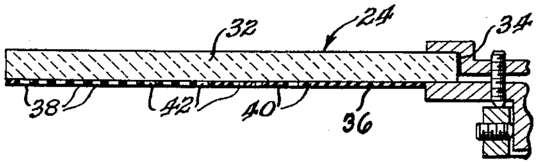
FIGURE 2 is a sectional view of the code disc of the encoder illustrated in FIGURE 1.

The code disc 24 is constructed with a transparent base 32 which is provided with an axial aperture 34 which is secured to the end of the shaft 20. The base 32 may be constructed of any transparent material of suitable mechanical properties, and glass has been found to be particularly suitable. The surface confronting the photocell assembly 26 has a coating 36 of opaque material, and sixteen annular tracks 38 formed of opaque sectors 40 and transparent sectors 42 are disposed in the coating 36 coaxially about the shaft 20, as illustrated in FIGURE 2.

Figure 4:
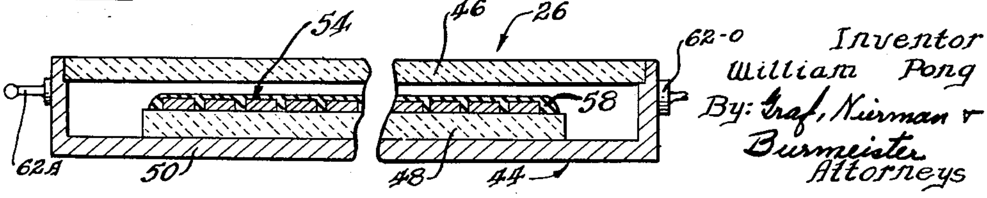
FIGURE 4 is a sectional view taken along the line 4—4 of FIGURE 3.

As indicated in FIGURES 3 and 4, the photocell assembly 26 has a hollow rectangular housing 44 disposed thereabout. The housing 44 is provided with a transparent cover 46 and forms a hermetical seal about the photocells. A plate 48 of electrical insulating material, in the particular construction glass, is secured to a base 50 of the housing 44 which confronts the cover 46. A first group 52 of electrodes 52A, 52B, 52C, 52D, 52E, 52F, 52G, 52H, 52I, 52J, 52K, 52L, 52M, 52N, 52O, and 52P confront a second group 54 of electrodes 54A, 54B, 54C, 54D, 54E, 54F, 54G, 54H, 54I, 54J, 54K, 54L, 54M, 54N, 54O, and 54P, this second group 54 of electrodes being interconnected at their ends remote from the first group of electrodes. The confronting surfaces of the electrodes in the two groups 52 and 54 are disposed on spaced parallel axes, thereby aligning the regions between the electrodes on a common axis which is parallel to a radius of the code disc 24.

A layer of photoconductive material 58 is disposed on the surface of the plate 48 opposite the base 50 of the housing and extends in the form of a ribbon across the two groups 52 and 54 of electrodes filling the region between the confronting ends of the two groups of electrodes. The most suitable materials for the photoconductive ribbon 58 have been found to be of the photoconductive semi-conductor class. Cadmium selenide has been found to produce the fastest light response thus far, and cadmium sulfide, lead sulfide (PbS) and lead selenide (PbSe) have also been found to be particularly suitable. Other suitable photoconductive materials for the layer 58 are ZnSe, ZnS, ZnTe, CdTe, germanium, silicon, and PbTe.

The electrodes of the second group 54 are connected to a common terminal 60 mounted on the housing 44 and insulated from other electrical conductors. Each of the electrodes of the first group 52 are connected to separate terminals 62A, 62B, 62C, 62D, 62E, 62F, 62G, 62H, 62I, 62J, 62K, 62L, 62M, 62N, 62O, and 62P, respectively.

The sensitive regions of the photocell assembly 26 are the regions between the confronting pairs of the electrodes, such as the region between electrode 52A and 54A. These regions are disposed confronting one of the tracks of the code disc 24; for example, the outermost track of the code disc 24 is confronted by the region between the electrodes 52A and 54A, and the innermost track of the code disc is confronted by the region between the electrodes 52P and 54P. The photocells will only produce a response when light impinges upon the sensitive region thereof, and this will only occur when a transparent sector of the track of the code disc 24 is disposed between the sensitive region of a given photocell and the light source 28.

It is to be noted that the photoconductive layer or ribbon 58 extends between adjacent electrodes of each group. This, however, does not create coupling between the adjacent electrodes of each group because of the fact that the regions between adjacent electrodes are maintained dark by the opaque coating on the code disc 24 between adjacent tracks. As a result, the electrical resistance of the layer 58 of photoconductive material remains high in these regions.

In order to eliminate the conventional radial-defining slit disposed between the code disc 24 and the photocell assembly 26, it is necessary that the photocell assembly 26 be positioned closely adjacent to the code disc 24 and that the spaces between the confronting groups of electrodes be less than the length of the smallest sector in the confronting code tracks. In order to obtain a high light to dark ratio from the photocells, that is, a large electrical response to illumination relative to the dark condition, it is necessary to position the photocell assembly 26 as close to the code disc 24 as possible. This is due to the fact that light intensity falls off inversely as the square of the distance from the source, and also due to the fact that diffraction and reflection of light have the effect of partially illuminating dark sectors. The applicant has found that the distance between the code disc 24 and the photocells must be maintained not more than ten times the length of the shortest sector of the code disc in order to achieve a suitable light to dark response ratio from the photocells. Further, the response time of the photocells is a function of the distance from the code disc, since a photocell responds more rapidly to intense illumination than to lesser illumination. In order to achieve high accuracy and to permit rapid rotation rates of the code disc, it is necessary that the space between confronting electrodes of the photocells be less than the arc length of the shortest sector of a track on the code disc. By limiting the spacing between confronting electrodes in the photocell assembly to less than the arc length of the shortest sector of the confronting track of the code disc, the inventor has limited the sensitive area of the photocells to eliminate the necessity of a radial defining slit.

In one construction of an encoder according to the present invention, the code disc 24 employed a glass base 32 8½ inches in diameter provided with 16 tracks 38 with widths of 0.060 inch, the tracks being spaced by a distance of 0.040 inch. The outer track on the disc 24 has a diameter of 8 inches and the inner track a diameter of 4.8 inches. The number of angles or quantum resolved is 65,536, each quantum representing approximately twenty seconds or arc. There are 16,384 opaque and 16,384 clear lines in the outer track. Each opaque and clear line is equal in width and each is 19.5 microns wide in the outer track. The radial pattern boundaries are accurate to one-half of the quantum angle in order to maintain accuracy. A photographic process is employed to place the opaque photographic emulsion on the glass plate.

The distance between the photocell assembly 26 and the code disc 24 is approximately 0.003 inch. This small spacing is maintained in close tolerance to reduce errors caused by spreading of the light after passing through the code disc. The two groups of electrodes 52 and 54 are maintained at a spacing of 8 microns. With cadmium selenide as the coating material 58, 65% of the current rise or decay is accomplished in 25 microseconds or less, when the cell is sufficiently illuminated by a 5-watt tungsten lamp situated at a distance of one-half inch from the cell.

The photocells may be constructed with a printing technic. The electrodes 52 and 54 are printed upon the glass base plate 48 in the form of an Inconel film. The photoconductive ribbon 58 is then deposited by vacuum evaporation on the plate 48 and Inconel electrodes 52 and 54. The photocells may also be constructed by evaporating a rhodium or aluminum coating on the glass plate 48, and thereafter etching the electrodes 52 and 54 on the rhodium or aluminum. The photoconductive ribbon 58 is then evaporated onto the glass plate and electrodes.

FIGURE 5 also illustrates an alternative construction providing hermetical sealing of the ribbon 58 of photoconductive material. Two strips 64 and 66 of cement are disposed on the base plate 48 and electrodes 54 and 52, respectively, adjacent to the ribbon 58 of photoconductive material. A thin strip 68 of transparent material is secured to the electrodes and the base plate 48 by the strips 64 and 66 of cement. A suitable material for the strip 68 has been found to be thin glass, and in one construction this glass strip 68 is 1.3 mil thick and 3/16 inch wide.

Even though the drawings of the foregoing disclosure illustrate an encoder employing a rotatable disc, the invention may clearly be practiced by a device employing rectilinear motion for impressing a code upon an analogue signal. In like manner, the invention may be practiced employing motions other than rectilinear and rotational.

From the foregoing disclosure, the man skilled in the art will readily devise many other embodiments of the present invention within the scope thereof. It is therefore intended that the scope of the present invention be not limited by the foregoing disclosure, but rather only by the appended claims.

The invention claimed is:

1. An encoder comprising, in combination, a photocell including a pair of electrodes having confronting portions spaced from each other and a mass of photoconductive material disposed between the electrodes, a light source confronting the photoconductive mass of the photocell, and a rotatable code disc mounted between the light source and photocell directly confronting the photocell having a track at a fixed distance from the axis of the disc including a plurality of opaque and transparent sectors aligned between the pair of electrodes and the light source, the length of the shortest sector being greater than the distance between the electrodes of the photocell, whereby no optical elements are disposed between the code disc and photocell thus avoiding light diffusion or attenuation.

2. An encoder comprising, in combination: a photocell including a base plate constructed of electrically insulating material, a pair of electrodes disposed on one surface of the plate having confronting portions spaced from each other, a mass of photoconductive material disposed between the electrodes; a light source confronting the photoconductive mass of the photocell; and a rotatable code disc mounted between the light source and photocells directly confronting the photocell having a track at a fixed distance from the axis of the disc including opaque and transparent sectors aligned between the pair of electrodes and the light source, the length of the shortest sector being greater than the distance between the electrodes of the photocell, whereby no optical elements are disposed between the code disc and photocell thus avoiding light diffusion or attenuation.

3. An encoder comprising, in combination: a photocell including a base plate constructed of electrically insulating material, a pair of electrodes disposed on one surface of the plate having confronting portions spaced from each other, a mass of photoconductive material disposed between the electrodes; a light source confronting the photoconductive mass of the photocell; and a rotatable code disc mounted between the light source and photocell directly confronting the photocell having a track at a fixed distance from the axis of the disc including opaque and transparent sectors aligned between the pair of electrodes and the light source, the length of the shortest sector being greater than the distance between the electrodes of the photocell, and the distance between the pair of electrodes and the code disc being not more than ten times the length of the shortest sector of the code disc, whereby no optical elements are disposed between the code disc and photocell thus avoiding light diffusion or attenuation.

4. An encoder comprising, in combination: a photocell assembly including a plurality of pairs of electrodes having spaced confronting portions, said pairs of electrodes being disposed adjacent to each other with aligned confronting portions, a mass of photoconductive material disposed between the electrodes of each pair; a light source confronting the space between each pair of electrodes; and a rotatable code disc mounted between the light source and photocell assembly directly confronting the photocell assembly having a plurality of coaxial tracks disposed thereabout, one track being aligned between each pair of electrodes and the light source, and each track having a plurality of opaque and transparent sectors of greater length than the distance between the electrodes in the confronting pair of electrodes, whereby no optical elements are disposed between the code disc and photocell assembly thus avoiding light diffusion or attenuation.

5. An encoder comprising, in combination: a photocell assembly having a base plate constructed of electrically insulating material, a plurality of pairs of electrodes having spaced confronting portions disposed adjacent to each other on one surface of the base plate, the electrodes in each pair being disposed on opposite sides of a common axis, and a ribbon of photoconductive material disposed in contact with the electrodes along the common axis between the electrodes; a light source confronting the space between each pair of electrodes; and a rotatable code disc mounted between the light source and photocell asssembly directly confronting the photocell assembly having a plurality of coaxial tracks disposed thereabout, one track being aligned between each pair of electrodes and the light source, and each track having a plurality of opaque and transparent sectors of greater length than the distance between the electrodes in the confronting pair of electrodes, whereby no optical elements are disposed between the code disc and photocell assembly thus avoiding light diffusion or attenuation.

6. An encoder comprising the elements of claim 5 wherein the ribbon comprises cadmium selenide.

7. An encoder comprising the elements of claim 5 in combination with means for hermetically sealing the photoconductive ribbon including a transparent portion confronting the ribbon of photoconductive material.

8. An encoder comprising the elements of claim 5 wherein the base plate consists of glass and the electrodes consist of a layer of Inconel on the base plate.

9. An encoder comprising the elements of claim 5 wherein the base plate consists of glass and the electrodes consist of a layer of rhodium disposed upon the base plate.

10. An encoder comprising the elements of claim 5 wherein the base plate consists of glass, and the electrodes consist of a layer of aluminum disposed upon the glass plate.

11. An encoder comprising the elements of claim 5 wherein the ribbon of photoconductive material consists of lead selenide.

12. An encoder comprising the elements of claim 5 wherein the ribbon of photoconductive material consists of zinc telluride.

13. An encoder comprising the elements of claim 5 wherein the ribbon comprises cadmium sulfide.

14. An encoder comprising the elements of claim 5 wherein the ribbon comprises lead sulfide.

15. An encoder comprising the elements of claim 5 wherein the ribbon comprises zinc selenide.

16. An encoder comprising the elements of claim 5 wherein the ribbon comprises zinc sulfide.

17. An encoder comprising the elements of claim 5 wherein the ribbon of photoconductive material consists of cadmium telluride.

18. An encoder comprising the elements of claim 5 wherein the ribbon of photoconductive material consists of germanium.

19. An encoder comprising the elements of claim 5 wherein the ribbon of photoconductive material consists of silicon.

20. An encoder comprising, a photocell including in combination, a pair of electrodes having confronting portions spaced from each other and a mass of photoconductive material disposed between the electrodes, a light source confronting the photoconductive mass of the photocell, and a code member having a plurality of opaque and transparent segments aligned between the pair of electrodes and the light source, said code member directly confronting the photocell, and the length of the shortest segment being greater than the distance between the electrodes of the photocell, whereby no optical elements are disposed between the code member and the photocell thereby avoiding light diffusion or attenuation.

21. An encoder comprising, in combination, a photocell assembly including a plurality of pairs of electrodes having spaced confronting portions, said pairs of electrodes being disposed adjacent to each other with aligned confronting portions, and a mass of photoconductive material disposed between the electrodes of each pair, a light source confronting the space between each pair of electrodes, and a code member having a plurality of tracks disposed thereon, one track being aligned between each pair of electrodes and the light source, and each track having a plurality of opaque and transparent segments of greater length than the distance between the electrodes in the confronting pair of electrodes, said code member directly confronting the photocell assembly, whereby no optical elements are disposed between the code member and the photocell assembly thus avoiding light diffusion or attenuation.

References Cited in the file of this patent

UNITED STATES PATENTS

| | | |
|---|---|---|
| 874,868 | Rothschild | Dec. 24, 1907 |
| 2,426,494 | Evans | Aug. 26, 1947 |
| 2,582,850 | Rose | Jan. 15, 1952 |
| 2,590,110 | Lippel | Mar. 25, 1952 |
| 2,591,665 | Ayres | Apr. 8, 1952 |
| 2,679,644 | Lippel | May 25, 1954 |
| 2,685,054 | Brenner | July 27, 1954 |
| 2,688,564 | Forgue | Sept. 7, 1954 |
| 2,709,147 | Ziegler | May 24, 1955 |
| 2,714,204 | Lippel | July 26, 1955 |
| 2,728,835 | Mueller | Dec. 27, 1955 |
| 2,754,502 | Dickinson | July 10, 1956 |
| 2,755,020 | Belcher | July 17, 1956 |
| 2,793,807 | Yaeger | May 28, 1957 |
| 2,861,161 | Anderson | Nov. 18, 1958 |
| 2,866,878 | Briggs et al. | Dec. 30, 1958 |
| 2,932,592 | Cameron | Apr. 12, 1960 |
| 2,936,252 | Hanlet | May 10, 1960 |

UNITED STATES PATENT OFFICE
CERTIFICATE OF CORRECTION

Patent No. 3,076,959 February 5, 1963

William Pong

It is hereby certified that error appears in the above numbered patent requiring correction and that the said Letters Patent should read as corrected below.

Column 1, line 28, for "photocels" read -- photocells --; column 3, line 64, for "or" read -- of --; column 6, line 21, strike out "a photocell including" and insert the same in line 22, after "combination," same column 6.

Signed and sealed this 10th day of November 1964.

(SEAL)
Attest:

ERNEST W. SWIDER
Attesting Officer

EDWARD J. BRENNER
Commissioner of Patents